(12) United States Patent
Dan et al.

(10) Patent No.: US 7,464,298 B2
(45) Date of Patent: Dec. 9, 2008

(54) METHOD, SYSTEM, AND COMPUTER PROGRAM PRODUCT FOR MULTI-DOMAIN COMPONENT MANAGEMENT

(75) Inventors: Asit Dan, Pleasantville, NY (US); David L. Kaminsky, Chapel Hill, NC (US); David M. Ogle, Cary, NC (US); John J. Rofrano, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 11/173,118

(22) Filed: Jul. 1, 2005

(65) Prior Publication Data
US 2007/0006044 A1 Jan. 4, 2007

(51) Int. Cl.
G06F 11/00 (2006.01)
(52) U.S. Cl. .................................... 714/38
(58) Field of Classification Search .............. 714/31, 714/38
See application file for complete search history.

(56) References Cited

U.S. PATENT DOCUMENTS

| | | | | |
|---|---|---|---|---|
| 6,038,378 A | * | 3/2000 | Kita et al. ............... | 714/38 |
| 6,457,130 B2 | * | 9/2002 | Hitz et al. ............... | 726/27 |
| 6,732,167 B1 | | 5/2004 | Swartz et al. | |
| 6,732,179 B1 | * | 5/2004 | Brown et al. ............ | 709/229 |
| 7,120,650 B2 | * | 10/2006 | Loy et al. ................ | 707/200 |
| 7,124,119 B2 | * | 10/2006 | Bigus et al. ............. | 706/10 |
| 2002/0184368 A1 | | 12/2002 | Wang | |
| 2004/0034688 A1 | * | 2/2004 | Dunn ....................... | 709/206 |
| 2004/0230650 A1 | | 11/2004 | Vambenepe et al. | |
| 2005/0015674 A1 | * | 1/2005 | Haugh ..................... | 714/38 |
| 2006/0294431 A1 | * | 12/2006 | Bader et al. ............. | 714/38 |

OTHER PUBLICATIONS

Chase, Nicholas, "An autonomic computing roadmap," http://www-106.ibm.com/developerworks/library/ac-roadmap/index.html, Feb. 17, 2004.

* cited by examiner

Primary Examiner—Robert Beausoliel
Assistant Examiner—Amine Riad
(74) Attorney, Agent, or Firm—Stephen A. Calogero; Dillon & Yudell LLP

(57) ABSTRACT

Components in a plurality of administrative domains that are communicatively coupled by a network are automatically managed. Permission to implement a corrective action in a second administrative domain is obtained by a management program in a first administrative domain that does not have existing permission to act in the second administrative domain. Responsive to obtaining the permission, the corrective action is implemented in the second administrative domain under control of the management program in the first administrative domain.

28 Claims, 4 Drawing Sheets

METHOD, SYSTEM, AND COMPUTER PROGRAM PRODUCT FOR MULTI-DOMAIN COMPONENT MANAGEMENT

BACKGROUND OF THE INVENTION

The present invention relates to computer networks, and more particularly, to management of components in computer networks.

Information Technology (IT) systems, methods and computer program products, including, for example, computer networks, have grown increasingly complex with the use of distributed client/server applications, heterogeneous platforms and/or multiple protocols all on a single physical backbone. This increase in the complexity of systems may make solution management more complex. Solutions may include collections of software and hardware components to address specific customer business requirements. In a solution, problem determination (PD) may include problem detection, isolation, and resolution using components participating in a solution across a multiplicity of platforms.

In conventional automatic computing system management, also known as autonomic computing, components, such as applications, middleware, hardware devices and the like, generate data that indicates the status of the component. An adapter may be used to convert this component status data into a common format. For example, International Business Machines Corporation's Generic Log Adapter (GLA) may be used in autonomic computing systems to collect data from different data sources with many different formats. The GLA is a rule-based engine that can translate data from different native log formats into a standard format, known as the Common Base Event format (CBE). This component status data will, typically, be consumed by some management function utilized to monitor the system and/or for problem analysis/resolution. The management function may, for example, be a management program that is consuming the data for analysis and/or display.

Knowledge bases have conventionally been used to map component status data, such as error log messages, to symptoms and eventually to fixes for problems. For example, there are symptom databases utilized by IBM, Armonk, N.Y., that map WebSphere error log messages to symptoms and fixes. These databases typically work on the assumption that if a specified error message (e.g., message "123") or sequence of error messages is received from a specified component (e.g., component "XYZ"), then a particular problem is occurring (e.g., the performance is slow) and a predefined corrective action (e.g., increase the parameter "buffsize" to 10) will likely fix the problem. However, in some instances, an operational error and/or other problem can manifest in a variety of sources as a symptom of a larger root problem elsewhere.

BRIEF SUMMARY OF THE INVENTION

Embodiments of the present invention provide a method, a system and a computer program product for automatically managing components in a plurality of administrative domains that are communicatively coupled by a network. In some embodiments, the method may include obtaining permission to implement a corrective action in a second administrative domain by a management program in a first administrative domain that does not have existing permission to act in the second administrative domain. For example, permission may be obtained by negotiating an agreement between the management program in the first administrative domain and an entity associated with the second administrative domain to implement the corrective action in the second administrative domain. The method may further include implementing the corrective action in the second administrative domain through the network under control of the management program in the first administrative domain responsive to obtaining the permission.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
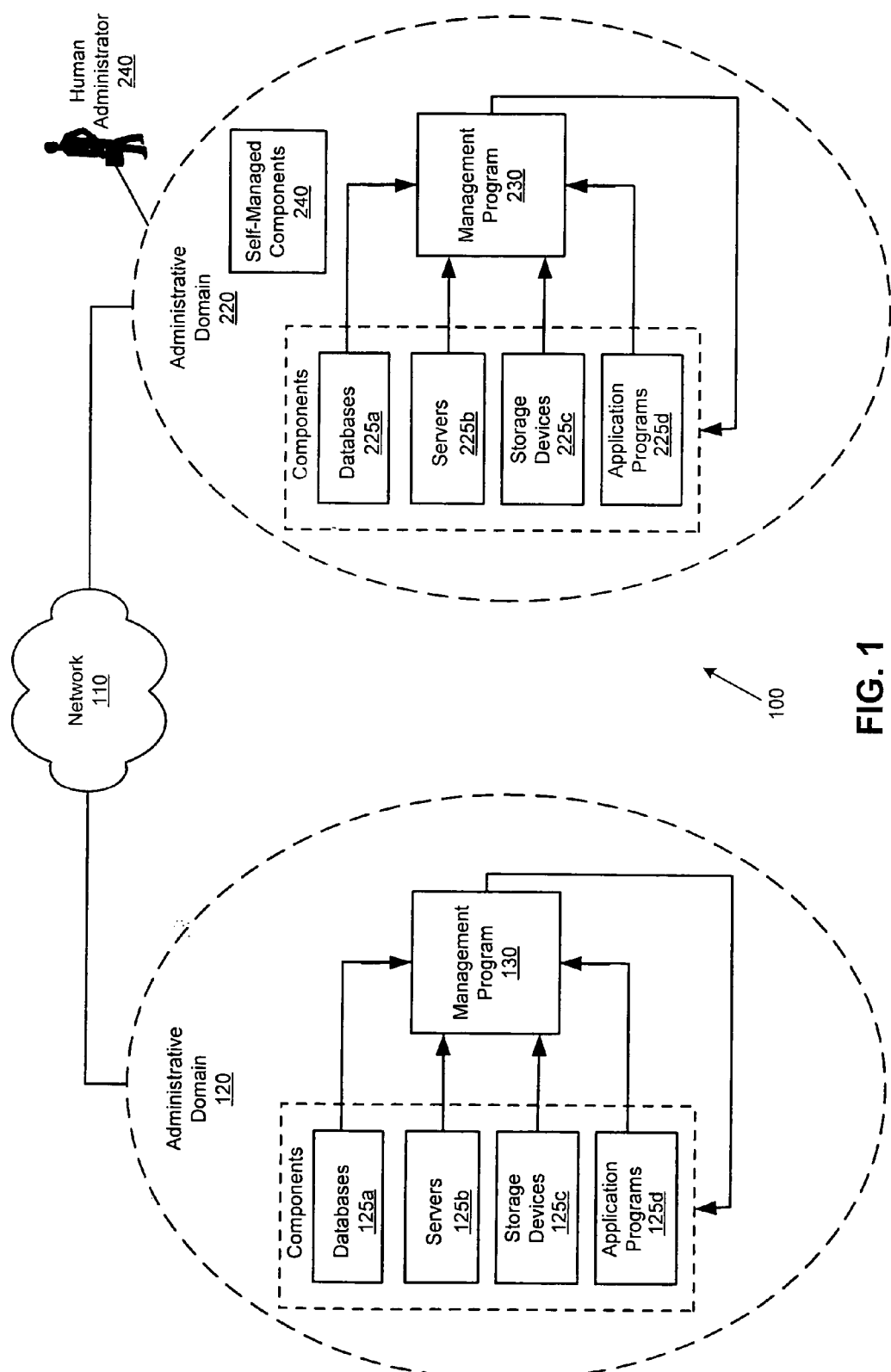
FIG. 1 is a block diagram illustrating multi-domain component management systems, methods, and/or computer program products according to some embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items, and may be abbreviated as "/".

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java™ Smalltalk or C++ programming languages (Java is a trademark of Sun Microsystems, Inc. in the United States, other countries, or both). However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable or computer usable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating Information Technology (IT) systems, methods, and/or computer program products according to some embodiments of the present invention. As shown in FIG. 1, an IT system 100 includes a network 110 and first and second administrative domains 120 and 220 communicatively coupled by the network 110. As used herein, an administrative domain may include a group of computers and/or other devices in a network that are administered as a unit with common rules and/or procedures. For example, each administrative domain may comprise an autonomic computing system. The administrative domain 120, which may be referred to hereinafter as a first administrative domain 120, includes a plurality of software and/or hardware components 125a-125d. As shown in FIG. 1, the components of the first administrative domain 120 may include databases 125a, servers 125b, storage devices 125c, and application programs 125d.

The first administrative domain 120 further includes a management program 130. The management program 130 may be configured to receive component status information from the plurality of components 125a-125d and thereby recognize operational errors and/or other problems in the first administrative domain 120. In some embodiments, the management program 130 may be a problem determination component and/or an autonomic manager for the first administrative domain 120 in an autonomic computing system. The first administrative domain 120 may also include an adapter, such as a generic log adapter (GLA), which may be configured to receive messages and/or other component status information from the components 125a-125d and convert the messages/status information into a common format which can be understood by the management program 130. For example, the adapter may convert the component status information from the components 125a-125d into a Common Base Event (CBE) format representation of the status information, and may then provide the Common Base Event (CBE) format representation of the component status information to the management program 130.

Still referring to FIG. 1, the administrative domain 220, which may be referred to hereinafter as a second administrative domain 220, similarly includes a plurality of components 225a-225d as well as a management program 230. Other entities associated with the second administrative domain 220 include one or more self-managed components 240, and/or one or more human administrators 250. The IT system 100, network 110, administrative domains 120 and 220, and the components 125a-125d and 225a-225d thereof are well-known to those of skill in the art and need not be further described herein.

In some instances, an operational error and/or other problem may manifest in one or more administrative domains due to a root cause elsewhere. For example, an operational error and/or other problem may arise in the first administrative domain 120 which has a main and/or root cause in the second administrative domain 220. Although conventional management programs in the first administrative domain 120 may be configured to implement a solution in order to address the problem in the first administrative domain 120, the management programs in the first administrative domain 120 may be able to address the main and/or root cause of the operational error/problem in the second administrative domain 220.

For example, the first administrative domain 120 may include an IBM® WebSphere® Application Server (WAS) and related components, the second administrative domain 220 may include a Solaris™ server and related components, and a third administrative domain (not shown) may include a DB2® server and related components (IBM, WebSphere and DB2 are trademarks of International Business Machines Corporation in the United States, other countries, or both while Solaris is a trademark of Sun Microsystems in the United States, other countries, or both). A critical error reported in the WAS and DB2 domains may be traced to a misconfigured parameter in the Solaris domain. Although it may be possible to address the error in each of the WAS and/or DB2 domains, it may be desirable to address the root of the problem in the Solaris domain. For instance, if the error is caused by pairwise mismatches between WAS and Solaris and between DB2 and Solaris, it may be preferable to implement a single change in the Solaris domain to address the root cause, rather than to implement multiple changes in the WAS domain and the DB2 domain to locally address the error.

Accordingly, some embodiments of the present invention provide a management program 130 in the first administrative domain 120 that is configured to automatically obtain permission and/or authorization to implement a corrective action in the second administrative domain 220 in which the management program 130 does not currently have existing permission to act. As used herein, the terms "automatically" and/or "automated" mean that substantially all or all of the operations so described can be carried out without requiring active manual input of a human operator, and typically mean that the operation(s) can be programmatically electronically directed and/or carried out. For example, the management program 130 may be configured to negotiate an agreement with at least one entity associated with the second administrative domain 220 in order to obtain the permission to implement the corrective action in the second administrative domain 220. The management program 130 may be further configured to automatically implement the corrective action in the second administrative domain 220 responsive to obtaining the permission.

Although the administrative domains 120 and 220 of FIG. 1 are illustrated as including particular components therein, additional and/or other components which are not illustrated may also be included. For example, although the self-managed components 240 are illustrated as being part of the second administrative domain 220 in FIG. 1, the self managed components 240 may themselves be considered as another administrative domain. Thus, the present invention should not be construed as limited to the configuration of FIG. 1, but is intended to encompass any configuration capable of carrying out the operations described herein. Embodiments of the present invention may take the form of an entirely hardware embodiment, an entirely software embodiment or an embodiment combining software and hardware aspects without departing from the teachings of the present invention.

Figure 2:
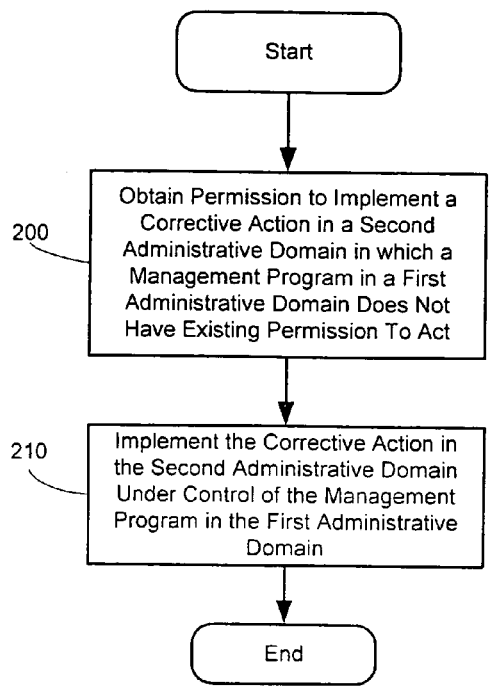
FIGS. 2 through 4 are flowcharts illustrating exemplary operations for managing components in a plurality of administrative domains according to some embodiments of the present invention.
Figure 3:
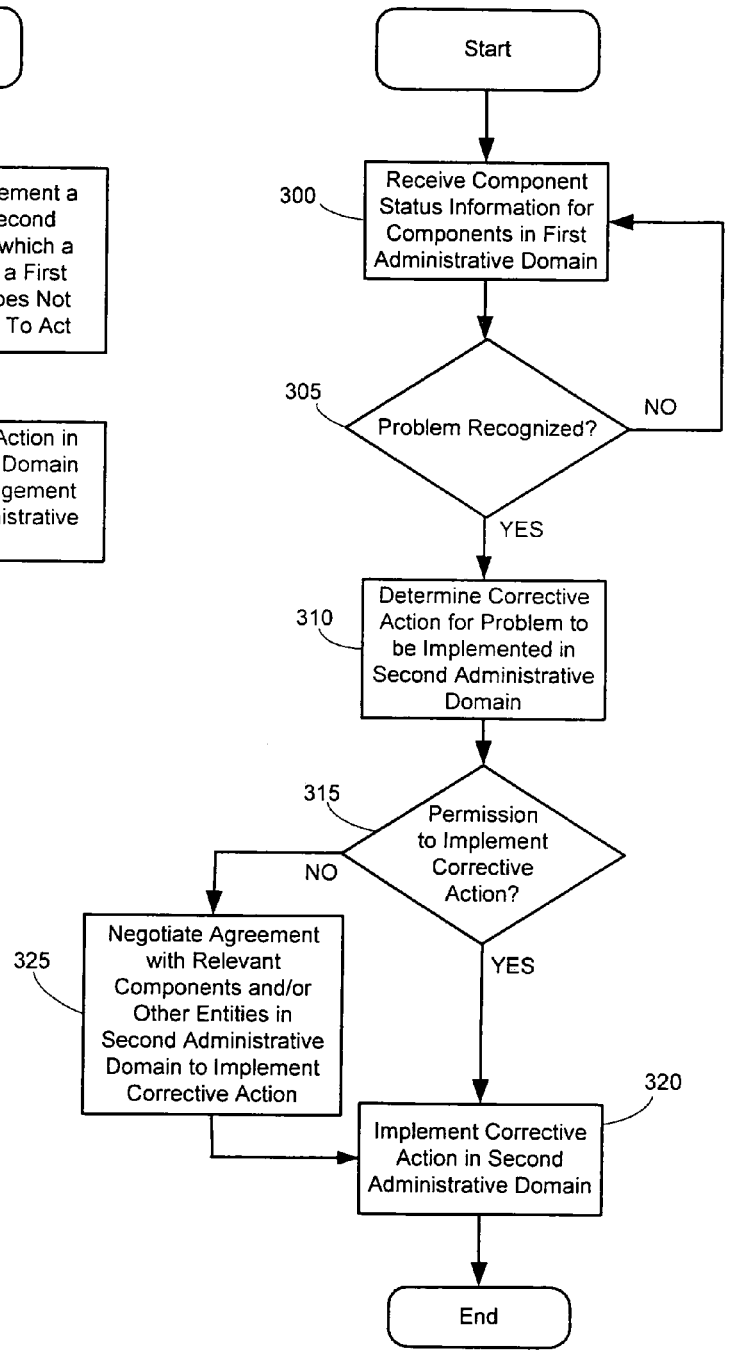
Figure 4:
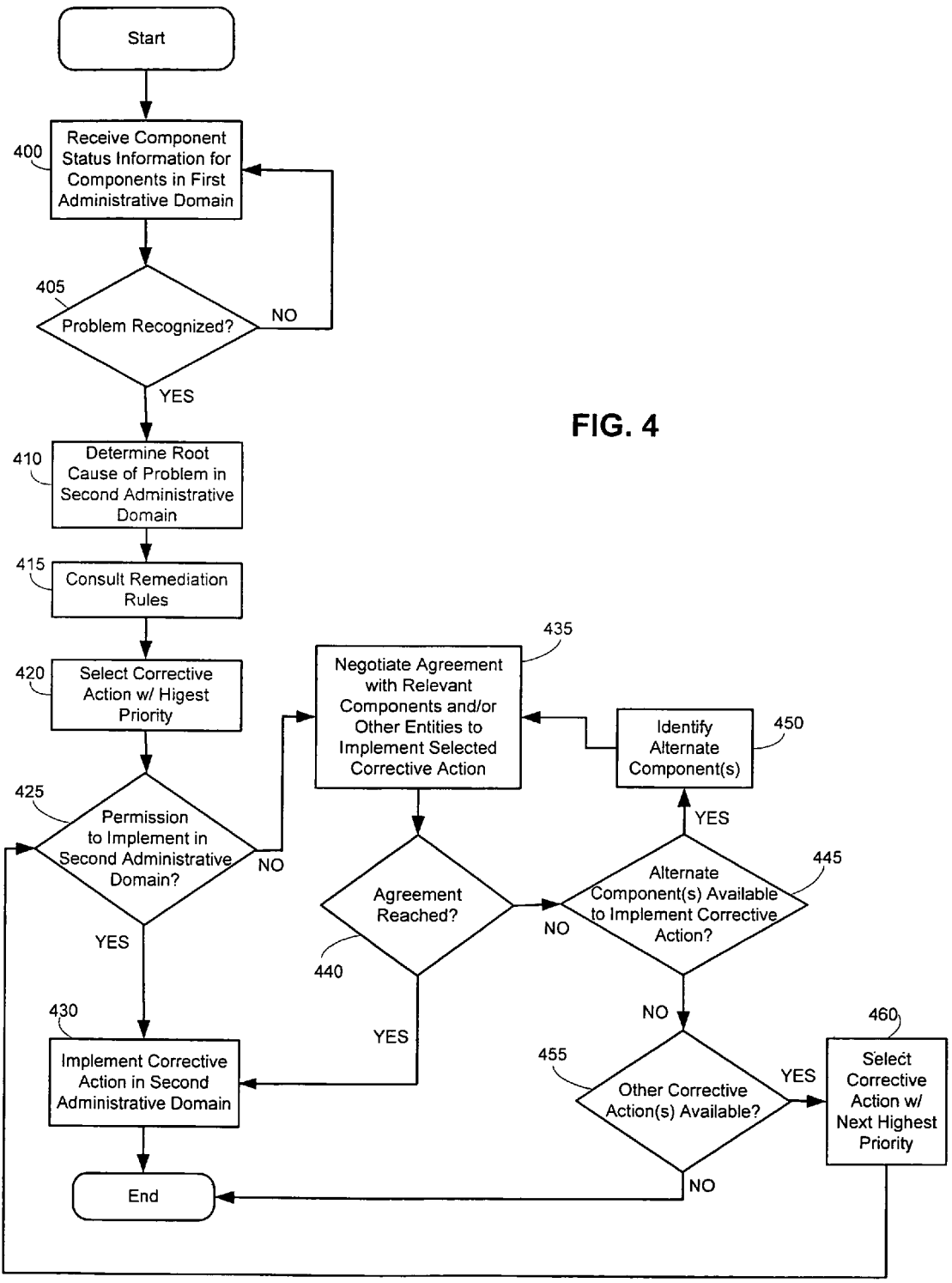

FIGS. 2 to 4 are flowcharts illustrating exemplary operations for managing components in a plurality of administrative domains according to some embodiments of the present invention.

Referring now to FIG. 2, operations begin at block 200 where permission to implement a corrective action in a second administrative domain is obtained by a management program in a first administrative domain. The first administrative domain and the management program therein may correspond to the administrative domain 120 and the management program 130 of FIG. 1. The second administrative domain may be a network and/or other system in which the management program in the first administrative domain does not have existing permission to act, and may correspond to the administrative domain 220 of FIG. 1. Then, at block 210, the corrective action is implemented in the second administrative domain under control of the management program in the first administrative domain responsive to obtaining the permission. More specifically, the corrective action may be implemented by a component in the second administrative domain responsive to a direction from the management program transmitted through the network.

FIG. 3 is a flowchart illustrating further exemplary operations according to some embodiments of the present invention. Referring now to FIG. 3, operations begin at block 300 where component status information is received at the management program from one or more components in the first administrative domain. For example, the components may correspond to the components 125*a*-125*d* in the first administrative domain 120 of FIG. 1. The component status information may include error messages and/or other log files, and may be received at the management program in a common format, such as a Common Base Event (CBE) format. The component status information may be converted into the common format by an adapter, such as a generic log adapter (GLA), connected between the components of the first administrative domain and the management program. Based on the received component status information, it is determined whether an operational error and/or other problem in the first administrative domain is recognized at block 305. For example, the management program may consult a knowledge base to map the received component status information to a potential operational error/problem.

If no operational error/problem is recognized by the management program based on the received component status information at block 305, operations return to block 300 where additional component status information is received. However, if an operational error and/or other problem is recognized at block 305, a corrective action for the operational error/problem is determined at block 310. As discussed above, the corrective action may require implementation in a second administrative domain in which the management program may not be authorized to act. As such, it is determined whether the management program has existing permission to implement the corrective action in the second administrative domain at block 315. If so, the corrective action is implemented in the second administrative domain under control of the management program in the first administrative domain at block 320.

However, if it is determined that the management program does not have permission to implement the corrective action in the second administrative domain at block 315, an agreement is negotiated between the management program and a component and/or other entity in the second administrative domain that is authorized to implement the corrective action in the second administrative domain at block 325. For example, depending on the corrective action required, the management program may negotiate an agreement, encoded in a form such as WS-Agreement, with a self-managed component, such as the self-managed component 240 of FIG. 1, in the second administrative domain in order to obtain permission to implement the corrective action. Alternatively, the management component may negotiate an agreement with another management program, such as the management program 230, in the second administrative domain. In some embodiments, the management program 230 in the second administrative domain may be an autonomic manager program for the second administrative domain. As a further alternative, the management program may negotiate an agreement with a human administrator, such as the human administrator 250, associated with the second administrative domain, for example, via a user interface configured to accept input from the human administrator 250.

Upon negotiation of a successful agreement, the corrective action is implemented in the second administrative domain under control of the management program at block 320. For example, where the agreement is a WS-Agreement between the management program and the self-managed component of the second administrative domain, a request may be transmitted from the management program to the self managed component to directly implement the corrective action in the second administrative domain pursuant to the agreement. Similarly, requests may be transmitted to the autonomic manager and/or the human administrator of the second administrative domain to implement the corrective action in the second administrative domain pursuant to negotiating a successful agreement therewith.

FIG. 4 is a flowchart illustrating additional exemplary operations for managing components in a plurality of administrative domains according to some embodiments of the present invention. Referring now to FIG. 4, after receiving component status information at block 400 and recognizing an operational error and/or other problem in the first administrative domain based on the component status information at block 405, a corrective action is determined by the management program in the first administrative domain in order to address the operational error/problem. More specifically, at block 410, a main and/or root cause for the operational error/problem is determined by the management program. According to some embodiments of the present invention, it is determined that the root cause is associated with the second administrative domain.

Then, at block 415, remediation rules are consulted by the management program. The remediation rules may be stored in a database, and may include a list of operational errors/problems including causes thereof and at least one predetermined corrective action for at least some of the operational errors/problems. The remediation rules may further identify at least one component in the second administrative domain that is configured to implement a respective predetermined corrective action in the second administrative domain. The list of corrective actions provided by remediation rules may be prioritized such that the management program can identify more desirable and/or less desirable corrective actions for a particular operational error/problem and/or for the root cause thereof. The priority of each corrective action may take into account the overall effects of implementing a corrective action, both on the network and on the individual components of each administrative domain, as well as the severity of the operational/error and/or costs associated with delegation.

As such, a corrective action for the operational error/problem which has a highest priority is selected to be implemented in the second administrative domain by the management program in the first administrative domain at block 420. Then, at block 425, it is determined whether the management program in the first administrative domain has existing permission to implement the selected corrective action in the second administrative domain. If so, the selected corrective action is implemented in the second administrative domain under control of the management program at block 430. However, if the management program does not currently have permission to implement the selected corrective action in the second administrative domain, an agreement to implement the selective corrective action is negotiated between the management program and relevant components and/or other entities associated with the second administrative domain at block 435. As described above, the relevant components for implementing the selected corrective action may be identified in the remediation rules. For example, based on a particular selected corrective action, the management component, which may be an autonomic manager of the first administrative domain, may negotiate an agreement in the WS-Agreement format with a self-managed component in the second administrative domain to implement the selected corrective action in the second administrative domain.

If an agreement is reached between the management component and the identified relevant components in the second administrative domain at block 440, the selected corrective action is implemented under the control of the management program at block 430. For example, the management program may transmit a request to the relevant components to implement the selected corrective action pursuant to the agreement. However, if the agreement is rejected by one or more relevant components of the second administrative domain at block 440, it is determined whether one or more alternate components in the second administrative domain are available to implement the selective corrective action in the second administrative domain at block 445. If so, the alternate component(s) are identified at block 450, and an agreement is negotiated between the management program and the alternate component(s) at block 435. If the agreement is accepted at block 440, the corrective action is implemented in the second administrative domain by the alternate component(s) at block 430 under control of the management program.

Alternatively, if the management program determines that no alternate components are available to perform the selected corrective action at block 445, it is determined whether other corrective actions for the operational error/problem are available from the prioritized list of corrective actions contained in the remediation rules at block 455. If other corrective actions for the operational error/problem are available from the remediation rules, the corrective action having the next-highest priority is selected from the prioritized list of corrective actions at block 460, and permission to implement the newly-selected corrective action is obtained as described above. If no alternate components or other corrective actions are available, operations end.

Figure 5:
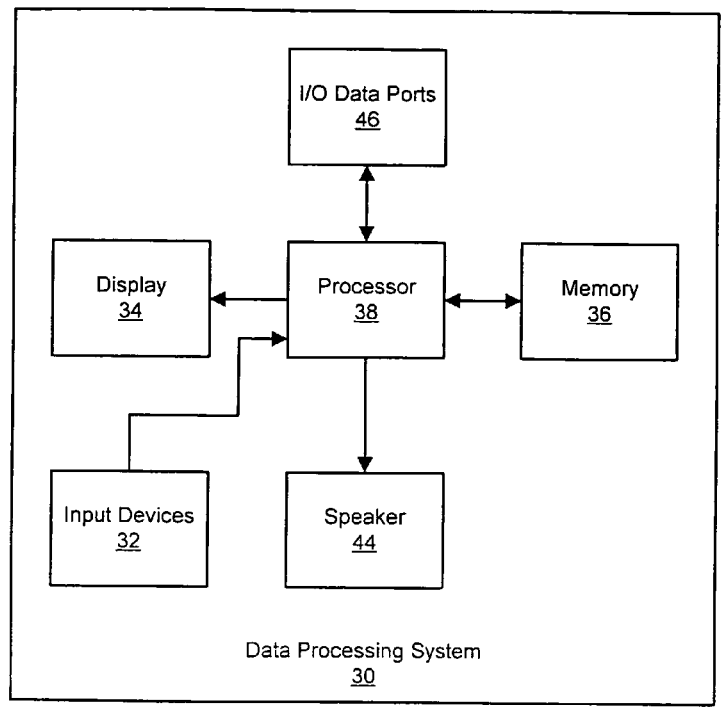
FIG. 5 is a block diagram of a data processing system suitable for use in managing components in a plurality of administrative domains according to some embodiments of the present invention.

FIG. 5 is a block diagram of data processing systems suitable for use in systems, methods, and computer program products according to some embodiments of the present invention. Referring now to FIG. 5, an exemplary embodiment of a data processing system 30 typically includes input device(s) 32 such as a keyboard or keypad, a display 34, and a memory 36 that communicate with a processor 38. The data processing system 30 may further include a speaker 44, and an I/O data port(s) 46 that also communicate with the processor 38. The I/O data ports 46 can be used to transfer information between the data processing system 30 and another computer system or a network. These components may be conventional components, such as those used in many conventional data processing systems, which may be configured to operate as described herein.

Figure 6:
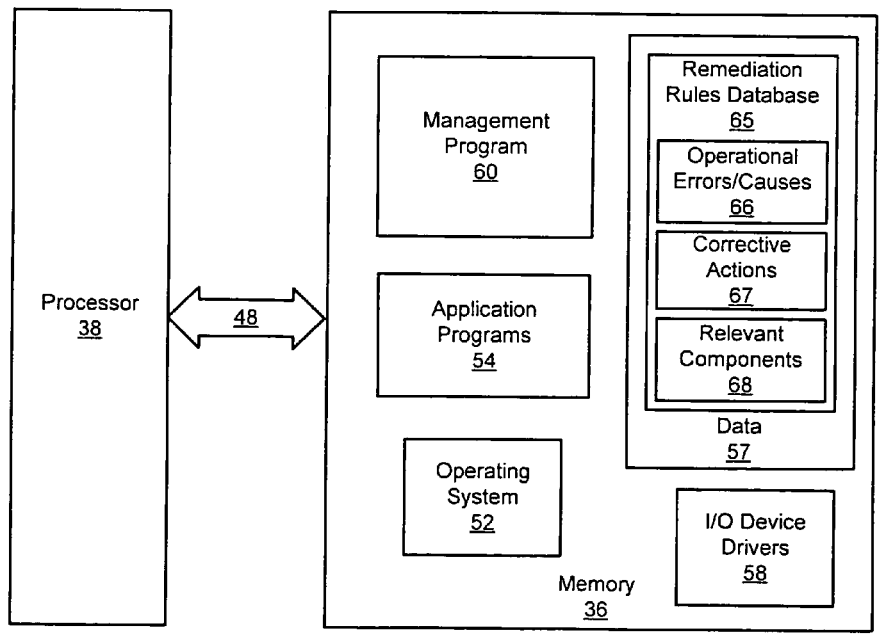
FIG. 6 is a more detailed block diagram of a data processing system for managing components in a plurality of administrative domains according to some embodiments of the present invention.

FIG. 6 is a block diagram further illustrating data processing systems suitable for use in systems, methods, and computer program products in accordance with embodiments of the present invention. As shown in FIG. 6, the processor 38 communicates with the memory 36 via an address/data bus

48. The processor 38 can be any commercially available or custom processor, such as a microprocessor. The memory 36 is representative of the overall hierarchy of memory devices containing the software and data used to implement the functionality of the data processing system 30. The memory 36 can include, but is not limited to, the following types of devices: cache, ROM, PROM, EPROM, EEPROM, flash memory, SRAM and/or DRAM.

Still referring to FIG. 6, the memory 36 may include several categories of software and data used in the data processing system 30: the operating system 52; the application programs 54; the data 57; and the input/output (I/O) device drivers 58. As will be appreciated by those of skill in the art, the operating system 52 may be any operating system suitable for use with a data processing system, such as OS/2®, AIX® or System/390, Microsoft® Windows® 95, Windows 98, Windows 2000 or Windows XP, Solaris, Unix™ or Linux™ operating systems (OS/2, AIX and System/390 are trademarks of International Business Machines Corporation in the United States, other countries, or both, Microsoft and Windows are trademarks of Microsoft Corporation in the United States, other countries, or both, UNIX is a trademark of The Open Group in the United States, other countries, or both, while Linux is a trademark of Linus Torvalds in the United States, other countries, or both). The I/O device drivers 58 typically include software routines accessed through the operating system 52 by the application programs 54 to communicate with devices such as the I/O data port(s) 46 and certain memory 36 components. The application programs 54 are illustrative of the programs that implement the various features of the data processing system 30. Finally, the data 57 represents the static and dynamic data used by the application programs 54, the operating system 52, the I/O device drivers 58, and other software programs that may reside in the memory 36.

As is further seen in FIG. 6, the memory 36 may include a management program 60. The management program 60 may be a stand-alone application, or may be included in the application programs 54. The management program 60 may carry out operations described herein for automatically managing components in a plurality of administrative domains that are communicatively coupled by a network. As such, the management program 60 may correspond to the management program 130 of FIG. 1. More particularly, as described in detail above, the data processing system 30 may be included in a first administrative domain, and the management program 60 may be configured to obtain permission and/or authorization to implement a corrective action in a second administrative domain in which the management program does not have existing permission to act. For example, the management program 60 may be configured to negotiate an agreement with at least one entity associated with the second administrative domain in order to obtain the permission. The management program 60 may be further configured to implement the corrective action in the second administrative domain responsive to obtaining the permission.

Still referring to FIG. 6, the data portion 57 of memory 36 may include a remediation rules database 65. As described in detail above, the remediation rules database 65 may include a list of operational errors/problems including causes thereof 66, at least one predetermined corrective action for at least some of the operational errors/problems 67, and at least one relevant component 68 that is configured to implement a respective predetermined corrective action in the second administrative domain. The corrective actions 67 may be prioritized such that the management program 60 can identify more desirable and/or less desirable corrective actions for each of the operational errors/problems 66. Accordingly, after determining that an operational error and/or other problem 66 exists, the management program 60 may consult the remediation rules database 65, select a corrective action from the corrective actions 67, and determine at least one component for implementing the selected corrective action from the relevant components 68. The management program 60 may then obtain permission and/or implement the selected corrective action as described above through the network via the I/O data ports 46.

While the present invention is illustrated, for example, with reference to the management program 60 as a separate entity in FIG. 6, it will be appreciated by those of skill in the art that other configurations may also be utilized while still benefiting from the teachings of the present invention. For example, the management program 60 may also be incorporated into the operating system 52, the I/O device drivers 58 or other such logical division of the data processing system 30. Thus, the present invention should not be construed as limited to the configuration of FIG. 6 but is intended to encompass any configuration capable of carrying out the operations described herein.

Accordingly, some embodiments of the present invention use agreements, optionally encoded according to the WS-Agreement specification, to establish trust relationships that may influence the selection of corrective actions to address operational errors and/or other system problems. Managed components report status information, for example, using a Common Base Event (CBE) format, to a management and/or problem determination component. The management component may use correlation techniques to determine whether the system has been degraded based on the component status information, and if so, to determine a root cause for the problem/degradation.

Upon determining a root cause, the management program consults remediation rules, which may be stored in a database. The remediation rules may include one or more corrective actions having differentiating priorities for addressing the operational error and/or the root cause thereof. The management program selects the corrective action with the highest priority from the remediation rules, and then determines whether it has sufficient permission to implement the selected corrective action for all relevant components identified in the remediation rules. For example, the management program may be part of a first administrative domain, and the selected corrective action may require implementation in a second administrative domain in which the management program does not have existing permission to act.

If permission does not exist, the management program attempts to negotiate an agreement with all relevant components in order to implement the selected corrective action. If successful, the corrective action is implemented under control of the management program pursuant to the agreement. Should one or more component reject the agreement, the management program selects a corrective action having a next-highest priority from the remediation rules, and repeats the above process until the problem is corrected or until no suitable corrective actions remain.

In the drawings and specification, there have been disclosed embodiments of the invention and, although specific terms are employed, they are used in a generic and descriptive sense only and not for purposes of limitation, the scope of the invention being set forth in the following claims.

That which is claimed:

1. A method for automatically managing components in a plurality of administrative domains that are communicatively coupled by a network, the method comprising:

obtaining permission to implement a corrective action in a second administrative domain by a management program in a first administrative domain that does not have existing permission to act in the second administrative domain;

wherein obtaining permission comprises: negotiating an agreement between the management program in the first administrative domain and an entity associated with the second administrative domain to implement the corrective action in the second administrative domain; and implementing the corrective action in the second administrative domain under control of the management program in the first administrative domain responsive to obtaining the permission.

2. The method of claim 1, wherein the entity associated with the second administrative domain comprises a first component in the second administrative domain, and wherein the method further comprises:

identifying a second component in the second administrative domain that is configured to implement the corrective action in the second administrative domain if the agreement is rejected by the first component; and negotiating an agreement between the management program and the second component to implement the corrective action in the second administrative domain.

3. The method of claim 1, wherein the entity associated with the second administrative domain comprises a self-managed component in the second administrative domain that is configured to implement the corrective action in the second administrative domain, wherein the agreement comprises a web service (WS) agreement, and wherein implementing the corrective action in the second administrative domain comprises:

transmitting a request to the self-managed component in the second administrative domain to implement directly the corrective action in the second administrative domain pursuant to the agreement.

4. The method of claim 1, wherein the entity associated with the second administrative domain comprises an autonomic manager program in the second administrative domain, and wherein implementing the corrective action in the second administrative domain comprises:

transmitting a request to the autonomic manager program in the second administrative domain to implement the corrective action in the second administrative domain pursuant to the agreement.

5. The method of claim 1, wherein the entity associated with the second administrative domain comprises a user interface configured to accept input with respect to the second administrative domain, and wherein implementing the corrective action in the second administrative domain comprises:

transmitting a request to the user interface to implement the corrective action in the second administrative domain pursuant to the agreement.

6. The method of claim 1, further comprising:

recognizing an operational error associated with the first administrative domain by the management program in the first administrative domain; and determining the corrective action responsive to recognizing the operational error.

7. The method of claim 6, wherein determining the corrective action comprises:

determining a cause for the operational error in the second administrative domain by the management program in the first administrative domain;

consulting remediation rules comprising a list of operational errors and at least one predetermined corrective action for at least some of the operational errors, wherein the remediation rules identify at least one component in the second administrative domain for implementing a respective predetermined corrective action in the second administrative domain; and selecting the corrective action from the remediation rules responsive to determining the cause for the operational error.

8. The method of claim 7, wherein the remediation rules further comprise a prioritized list of corrective actions for a respective operational error and wherein the corrective action comprises a first corrective action from the prioritized list, and wherein the method further comprises:

selecting a second corrective action based on a priority thereof from the prioritized list of corrective actions by the management program when permission to implement the first corrective action is not obtained.

9. The method of claim 6, further comprising: receiving component status information in a Common Base Event (CBE) format at the management program in the first administrative domain from a plurality of components in the first administrative domain, wherein the management program comprises at least one of a problem determination component and an autonomic manager program for the first administrative domain, and wherein recognizing the operational error is responsive to receiving the component status information.

10. A system for automatically managing components in a plurality of administrative domains, comprising:

a network;

first and second administrative domains communicatively coupled by the network;

a processor for controlling operations within the first administrative domain; and a management program in the first administrative domain that is configured to, when executed on the processor, obtain permission to implement a corrective action in the second administrative domain in which the management program does not have existing permission to act, negotiate an agreement with the at least one entity associated with the second administrative domain in order to obtain the permission to implement the corrective action in the second administrative domain, and further configured to implement the corrective action in the second administrative domain responsive to obtaining the permission.

11. The system of claim 10, further comprising: at least one entity associated with the second administrative domain.

12. The system of claim 11, wherein the at least one entity comprises a first component in the second administrative domain that is configured to implement the corrective action, and wherein the system further comprises:

a second component in the second administrative domain that is configured to implement the corrective action in the second administrative domain, wherein the management program is further configured to identify the second component if the agreement is rejected by the first component and then negotiate an agreement with the second component in order to obtain the permission to implement the corrective action in the second administrative domain.

13. The system of claim 11, wherein the at least one entity comprises a self-managed component in the second administrative domain that is configured to implement the corrective action in the second administrative domain, wherein the agreement comprises a web service (WS) agreement, and wherein the management program is configured to transmit a request to the self-managed component to implement the corrective action in the second administrative domain pursuant to the agreement.

14. The system of claim 11, wherein the at least one entity comprises an autonomic manager program in the second administrative domain, and wherein the management program is configured to transmit a request to the autonomic manager program to implement the corrective action in the second administrative domain pursuant to the agreement.

15. The system of claim 11, wherein the at least one entity comprises a user interface configured to accept input with respect to the second administrative domain, and wherein the management program is configured to transmit a request to the user interface to implement the corrective action in the second administrative domain pursuant to the agreement.

16. The system of claim 10, wherein the management program is further configured to recognize an operational error associated with the first administrative domain and determine the corrective action responsive to recognizing the operational error.

17. The system of claim 16, further comprising:
a remediation rules database comprising a list of operational errors and at least one predetermined corrective action for at least some of the operational errors, wherein the remediation rules database identifies at least one component in the second administrative domain for implementing a respective predetermined corrective action in the second administrative domain,
wherein the management program is further configured to determine a cause in the second administrative domain for the operational error associated with the first administrative domain and select the corrective action from the remediation rules responsive to determining the cause for the operational error.

18. The system of claim 17, wherein the remediation rules database further comprises a prioritized list of corrective actions for a respective operational error, wherein the corrective action comprises a first corrective action selected from the prioritized list, and wherein the management program is further configured to select a second corrective action based on a priority thereof from the prioritized list when permission to implement the first corrective action is not obtained.

19. The system of claim 16, wherein the management program comprises at least one of a problem determination component and an autonomic manager program for the first administrative domain, and further comprising:
a plurality of components in the first administrative domain,
wherein the management program is further configured to receive component status information in a Common Base Event (CBE) format from the plurality of components and recognize the operational error responsive to the received component status information.

20. A computer program product for automatically managing components in a plurality of administrative domains that are communicatively coupled by a network, the computer program product comprising:
a computer readable medium having computer usable program code embodied therein, the computer usable program code comprising:
computer usable program code that is configured to obtain, by a first administrative domain, permission to implement a corrective action in a second administrative domain in which the computer usable program code that is configured to obtain pennission does not have existing perrmssion to act;
wherein the computer usable program code that is configured to obtain permission comprises computer usable program code that is configured to negotiate an agreement with an entity associated with the second administrative domain to implement the corrective action in the second administrative domain; and
computer usable program code that is configured to implement, by the first administrative domain, the corrective action in the second administrative domain responsive to obtaining the permission.

21. The computer program product of claim 20, wherein the entity associated with the second administrative domain comprises a first component in the second administrative domain, the computer program product further comprising:
computer usable program code that is configured to determine, by the first administrative domain, a second component in the second administrative domain that is configured to implement the corrective action in the second administrative domain if the agreement is rejected by the first component; and
computer usable program code that is configured to negotiate, by the first administrative domain, an agreement with the second component to implement the corrective action in the second administrative domain.

22. The computer program product of claim 20, wherein the entity associated with the second administrative domain comprises a self-managed component in the second administrative domain that is configured to implement the corrective action in the second administrative domain, wherein the agreement comprises a web service (WS) agreement, and wherein the computer usable program code that is configured to implement the corrective action in the second administrative domain comprises:
computer usable program code that is configured to transmit a request to the self-managed component in the second administrative domain to directly implement the corrective action in the second administrative domain pursuant to the agreement.

23. The computer program product of claim 20, wherein the entity associated with the second administrative domain comprises an autonomic manager program in the second administrative domain, and wherein the computer usable program code that is configured to implement the corrective action in the second administrative domain comprises:
computer usable program code that is configured to transmit a request to the autonomic manager program in the second administrative domain to implement the corrective action in the second administrative domain pursuant to the agreement.

24. The computer program product of claim 20, wherein the entity associated with the second administrative domain comprises a user interface configured to accept input with respect to the second administrative domain, and wherein the computer usable program code that is configured to implement the corrective action in the second administrative domain comprises:
computer usable program code that is configured to transmit a request to the user interface to implement the corrective action in the second administrative domain pursuant to the agreement.

25. The computer program product of claim 20, further comprising:
computer usable program code that is configured to recognize, by the first administrative domain, an operational error associated with the first administrative domain; and computer usable program code that is configured to determine, by the first administrative domain, the corrective action responsive to recognizing the operational error.

26. The computer program product of claim 25, wherein computer usable program code in the first administrative domain that is configured to determine the corrective action comprises:
- computer usable program code that is configured to determine, by the first administrative domain, a cause for the operational error in the second administrative domain;
- computer usable program code that is configured to consult, by the first administrative domain, remediation rules comprising a list of operational errors and at least one predetermined corrective action for at least some of the operational errors, wherein the remediation rules identify at least one component in the second administrative domain for implementing a respective predetermined corrective action in the second administrative domain; and
- computer usable program code that is configured to select, by the first administrative domain, the corrective action from the remediation rules responsive to determining the cause for the operational error.

27. The computer program product of claim 26, wherein the remediation rules further comprise a prioritized list of corrective actions for a respective operational error and wherein the corrective action comprises a first corrective action from the prioritized list, the computer program product further comprising:
- computer usable program code that is configured to select, by the first administrative domain, a second corrective action based on a priority thereof from the prioritized list of corrective actions when permission to implement the first corrective action is not obtained.

28. The computer program product of claim 25, further comprising:
- computer usable program code that is configured to receive, in the first administrative domain, component status information in a Common Base Event (CBE) format from a plurality of components in the first administrative domain,
- wherein the computer usable program code that is configured to recognize the operational error is executed responsive to receiving the component status information.

* * * * *